United States Patent
Han et al.

(10) Patent No.: US 11,109,287 B2
(45) Date of Patent: Aug. 31, 2021

(54) APPARATUS AND METHOD FOR MEASUREMENT CONFIGURATION IN WIRELESS COMMUNICATION SYSTEM

(71) Applicant: Samsung Electronics Co., Ltd., Suwon-si (KR)

(72) Inventors: Kwanghoon Han, Suwon-si (KR); Da-Woon Jung, Suwon-si (KR); Myounghwan Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/222,127

(22) Filed: Dec. 17, 2018

(65) Prior Publication Data
US 2019/0191346 A1  Jun. 20, 2019

(30) Foreign Application Priority Data
Dec. 19, 2017  (KR) .......................... 10-2017-0175415

(51) Int. Cl.
*H04W 36/00* (2009.01)
*H04W 36/38* (2009.01)
(Continued)

(52) U.S. Cl.
CPC ........ *H04W 36/0085* (2018.08); *H04B 7/024* (2013.01); *H04B 7/0695* (2013.01);
(Continued)

(58) Field of Classification Search
CPC ............. H04W 36/0085; H04W 36/38; H04W 36/0072; H04W 36/0058;
(Continued)

(56) References Cited

U.S. PATENT DOCUMENTS

2002/0115474 A1* 8/2002 Yoshino ................ H04W 16/28
455/562.1
2010/0035565 A1  2/2010 Baker et al.
(Continued)

FOREIGN PATENT DOCUMENTS

WO  2017/162283 A1  9/2017
WO  2017/164933 A1  9/2017

OTHER PUBLICATIONS

International Search Report dated Mar. 26, 2019, issued in International Application No. PCT/KR2018/016203.
(Continued)

*Primary Examiner* — Michael Y Mapa
(74) *Attorney, Agent, or Firm* — Jefferson IP Law, LLP

(57) ABSTRACT

The disclosure relates to a pre-5$^{th}$-Generation (5G) or 5G communication system to be provided for supporting higher data rates Beyond 4$^{th}$-Generation (4G) communication system such as long term evolution (LTE). A management device in a wireless communication system according to various embodiments of the present disclosure may include at least one transceiver, and at least one processor operatively coupled to the at least one transceiver. The at least one processor may be allocate a first time resource to a first base station to transmit a first measurement signal by using a first beam of the first base station, and allocate a second time resource to a second base station to transmit a second measurement signal by using a second beam of a second base station adjacent to the first base station on a designated path. The first beam and the second beam may be configured to communicate with a terminal on the designated path.

16 Claims, 13 Drawing Sheets

(51) Int. Cl.
*H04B 7/024* (2017.01)
*H04B 7/06* (2006.01)
*H04W 28/16* (2009.01)
*H04W 16/28* (2009.01)
*H04W 24/10* (2009.01)

(52) U.S. Cl.
CPC ........... *H04W 16/28* (2013.01); *H04W 24/10* (2013.01); *H04W 28/16* (2013.01); *H04W 36/0058* (2018.08); *H04W 36/0072* (2013.01); *H04W 36/00837* (2018.08); *H04W 36/38* (2013.01)

(58) Field of Classification Search
CPC ........... H04W 36/00837; H04W 28/16; H04W 16/28; H04W 24/10; H04B 7/024; H04B 7/0695
USPC ............ 455/25, 436–455, 456.1–457, 562.1; 370/329–331

See application file for complete search history.

(56) References Cited

U.S. PATENT DOCUMENTS

| | | |
|---|---|---|
| 2010/0260094 A1* | 10/2010 | Gruber .................. H04W 36/18 370/315 |
| 2014/0073337 A1 | 3/2014 | Hong et al. |
| 2014/0295842 A1 | 10/2014 | Choi et al. |
| 2015/0208424 A1 | 7/2015 | Seo |
| 2017/0099673 A1 | 4/2017 | Byun et al. |
| 2017/0111095 A1 | 4/2017 | Maltsev et al. |
| 2017/0164248 A1 | 6/2017 | Weber et al. |
| 2017/0289867 A1* | 10/2017 | Fan ................... H04W 36/0061 |
| 2017/0331577 A1 | 11/2017 | Parkvall et al. |
| 2018/0062770 A1* | 3/2018 | Reial ..................... H04B 17/16 |
| 2019/0273583 A1* | 9/2019 | Ugurlu ................. H04B 7/0408 |

OTHER PUBLICATIONS

International Search Written Opinion dated Mar. 26, 2019, issued in International Application No. PCT/KR2018/016203.
Extended European Search Report dated Jun. 8, 2020, issued in a counterpart European Application No. 18891725.6-1212.
European Office Action dated Dec. 22, 2020, issued in a counterpart European Application No. 18 891 725.6-1212.
European Office Action dated Apr. 30, 2021, issued in a counterpart European Application No. 18 891 725.6-1212.

* cited by examiner

APPARATUS AND METHOD FOR MEASUREMENT CONFIGURATION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2017-0175415, filed on Dec. 19, 2017, in the Korean Intellectual Property Office, the disclosure of which is incorporated by reference herein in its entirety.

BACKGROUND

1. Field

The disclosure relates to a wireless communication system. More particularly, the disclosure relates to an apparatus and method for a measurement configuration in the wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency millimeter wave (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency-shift keying (FSK) and quadrature amplitude (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Mobility of a terminal is supported in a 5G system. For this, the terminal may persistently measure quality for a serving cell which currently provides a service and quality of a signal for a neighboring cell. In this case, in a beamforming-based wireless communication system, when interference of the neighboring cell is not considered, there is a difference in a magnitude of interference between beams. As a result, a handover may be performed ineffectively.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for a beamforming-based measurement configuration in a wireless communication system.

Another aspect of the disclosure is to provide an apparatus and method for configuring a beam of each base station for a measurement in a wireless communication system.

Additional aspects will be set forth in part in the description which follows and, in part, will be apparent from the description, or may be learned by practice of the presented embodiments.

Another aspect of the disclosure is to provide an apparatus and method for resource allocation (beam scheduling) for a beam of each base station in a wireless communication system.

In accordance with an aspect of the disclosure, a management device in a wireless communication system is provided. The management device in a wireless communication system includes at least one transceiver, and at least one processor operatively coupled to the at least one transceiver. The at least one processor may be configured to allocate a first time resource to a first base station to transmit a first measurement signal using a first beam of the first base station, and allocate a second time resource to a second base station to transmit a second measurement signal using a second beam of a second base station adjacent to the first base station on a designated path. The first beam and the second beam may be configured to communicate with a terminal on the designated path.

In accordance with another aspect of the disclosure, a first base station apparatus in a wireless communication system is provided. The apparatus includes at least one processor, and at least one transceiver. The at least one transceiver may be configured to transmit a first measurement signal using a first beam of the first base station through a first time resource. The first time resource may be different from a second time resource for transmitting a second measurement signal using a second beam of a second base station adjacent to the first base station on a designated path. The first beam and the second beam may be configured to communicate with a terminal on the designated path.

In accordance with another aspect of the disclosure, a method of operating a management device in a wireless communication system is provided. The method includes allocating a first time resource to a first base station to transmit a first measurement signal using a first beam of the first base station, and allocating a second time resource to a second base station to transmit a second measurement signal using a second beam of a second base station adjacent to the first base station on a designated path. The first beam and the second beam may be configured to communicate with a terminal on the designated path.

In accordance with another aspect of the disclosure, a method of operating a first base station in a wireless communication system is provided. The method includes transmitting a first measurement signal using a first beam of the first base station through a first time resource. The first time resource may be different from a second time resource for transmitting a second measurement signal using a second beam of a second base station adjacent to the first base station on a designated path. The first beam and the second beam may be configured to communicate with a terminal on the designated path.

Another aspect of the disclosure is to provide an apparatus and method for configure an optimal measurement environment by transmitting a signal through a scheduled beam in consideration of interference, thereby performing an optimal handover.

Other aspects, advantages and salient features of the disclosure will become apparent to those skilled in the art from the following detailed descriptions, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
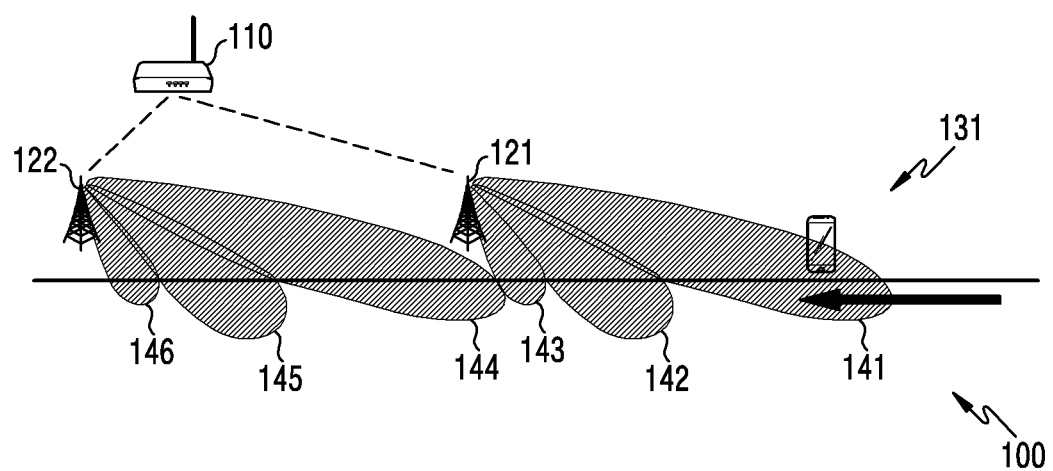
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

Terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A singular expression may include a plural expression unless there is a contextually distinctive difference. Unless otherwise defined, all terms (including technical and scientific terms) used herein have the same meaning as commonly understood by those ordinarily skilled in the art disclosed in the disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the disclosure should not be interpreted to exclude the embodiments of the disclosure.

A hardware-based approach is described for example in the various embodiments of the disclosure described hereinafter. However, since the various embodiments of the disclosure include a technique in which hardware and software are both used, a software-based approach is not excluded in the embodiments of the disclosure.

When a wide beam is used in a wireless communication system, it is easy to compare quality of a signal, and thus it is easy to recognize a handover time between cells. However, in case of a beamforming-based communication system which provides a relatively narrow beam, it may not be easy to accurately recognize a handover time between cells by comparing quality of a signal. Therefore, there is a desire for a method of recognizing a handover time in consideration of a directional beam.

Hereinafter, the disclosure relates to an apparatus and method for a measurement configuration in a wireless communication system. Specifically, the disclosure describes a technique for configuring a measurement environment to transmit a signal by varying a resource (e.g., a time resource, a spatial resource) between neighboring base stations, in order to decrease an influence of interference and to accurately perform a handover in the wireless communication system. The disclosure also describes a technique for supporting an effective handover of terminals which move on a designated path (e.g., a movement of a train on a railway, a movement of an automobile on a highway, a movement of a user on foot).

Terms used hereinafter to refer to a time resource (e.g., a symbol, a duration, a slot, a frame, and an interval), network entities, a constitutional element of a device, or the like are exemplified for convenience of explanation. Therefore, the disclosure is not limited to the terms described below, and thus other terms have the same technical meaning may also be used.

Although the disclosure also describes various embodiments by using terms used in some communication standards (e.g., $3^{rd}$ generation partnership project (3GPP)), this is for description purposes only. Various embodiments of the disclosure may be easily modified, and thus may also be applied to other communication systems.

FIG. 1 illustrates a wireless communication system according to an embodiment of the disclosure. As a part of nodes which use a wireless channel in a wireless communication environment 100, a beam management device 110, a first base station 121, a second base station 122, and a terminal 131 are exemplified in FIG. 1. The wireless communication environment 100 represents a network environment configured through beamforming. A term 'cell' used hereinafter may refer to a service range in a base station. The base station may cover one cell, or may cover multiple cells. Herein, the multiple cells may be divided according to a frequency for supporting the cells and a region of a sector for covering the cells. In the following description, the base station may be used as a term including a cell, or the cell may be used as a term referring to the base station. A serving cell is a cell which provides upper layer signaling (e.g., radio resource control (RRC) signaling) with respect to the terminal, and may refer to one cell or multiple cells.

Referring to FIG. 1, the beam management device 110 may be a device for configuring a beamforming operation. The beam management device 110 may be referred to as various terms such as a management device, a beamforming network configuration device, a network controller, a beam deployment device, a beam scheduler, a beam allocation device, an operating device, or the like. Hereinafter, the beam management device 110 is referred to as the management device 110.

The management device 110 may be a device for configuring a measurement environment by controlling beamforming based on each base station. For example, the management device 110 may control beamforming based on the first base station 121 or beamforming based on the second base station 122 to configure a measurement environment of the terminal 131.

The first base station 121 or the second base station 122 is a network infrastructure which provides a radio access to the terminal in a coverage. The first base station 121 or the second base station 122 has a coverage defined as a specific geographic region based on a distance in which a signal can be transmitted. In the disclosure, the coverage may imply a range in which a signal can be transmitted through beamforming, that is, may imply a beam coverage. In addition to the term 'base station', the first base station 121 or the second base station 122 may be referred to as an 'access point (AP)', an 'evolved Node B (eNB)', a '5$^{th}$ generation (5G) node', a '5G NodeB (NB)', a 'wireless point', a 'transmission/reception point (TRP)', a ' distributed unit (DU)', a 'radio unit (RU)', a 'remote radio head (RRH), or other terms having equivalent technical meanings.

As a device used by a user, the terminal 131 communicates with a base station of a corresponding operator through a wireless channel. Optionally, the terminal 131 may be operated without user involvement. For example, as a device for performing machine type communication (MTC), the terminal 131 may not be carried by a user. In addition to the term 'terminal', the terminal 131 may be referred to as a 'user equipment (UE)', a 'customer premise equipment (CPE)', a 'mobile station', a 'subscriber station', a 'remote terminal', a 'wireless terminal', an 'electronic device', a 'user device', or other terms having equivalent technical meanings. The terminal (e.g., the terminal 131) according to various embodiments of the disclosure may include, for example, at least one of a smart phone, a tablet PC, a mobile phone, a video phone, an electronic book reader, a desktop PC, a laptop PC, a netbook computer, a workstation, a server, a personal digital assistance (PDA), a portable multimedia player (PMP), an moving picture experts group phase 1 or phase 2 (MPEG-1 or MPEG-2) audio layer 3 (MP3) player, a medical device, a camera, or a wearable device.

The first base station 121, the second base station 122, and the terminal 131 may transmit and receive a radio signal at a millimeter Wave (mmWave) band (e.g., 28 GHz, 30 GHz, 38 GHz, 60 GHz). In this case, to improve a channel gain, the first base station 121, the second base station 122, and the terminal 131 may perform beamforming. Herein, the beamforming includes transmission beamforming and reception beamforming. That is, the first base station 121, the second base station 122, and the terminal 131 may give directivity to a transmission signal or a reception signal. The first base station 121 may perform beamforming through a first beam 141, a second beam 142, and a third beam 143, and the second base station 122 may perform beamforming through a fourth beam 144, a fifth beam 145, and a sixth beam 146. Although not shown in FIG. 1, the terminal 131 may also perform beamforming through a beam.

The management device 110 may configure a beam of each base station (hereinafter, a beam configuration). Specifically, the management device 110 may determine a region which can be covered through beamforming in each base station, that is, a beam coverage. The management device 110 may configure a beam of each base station for beam coverage to serve the terminal. In some embodiments, the management device 110 may determine a set of base stations (hereinafter, an operating base station set) or a set of beams at each base station (hereinafter, an operating beam set) to serve a designated path. The management device 110 may transmit to a specific base station a message including information on a beam (hereinafter, an operating beam) of the specific base station among beams of an operating beam set corresponding to the designated path. For example, the management device 110 may identify an operating beam set corresponding to a movement path of the terminal 131. The management device 110 may transmit to the first base station a message indicating the first beam 141, second beam 142, and third beam 143 of the first base station among beams of the operating beam set. The management device 110 may transmit to the second base station a message indicating the fourth beam 144, fifth beam 145, and sixth beam 146 of the second base station.

The management device 110 may schedule a beam to be operated by each base station (hereinafter, a resource configuration). Specifically, the management device 110 may allocate a time resource to each base station to transmit a signal through an operating beam of each base station in consideration of interference between each base station and a neighboring base station. According to various embodiments, during a base station transmits a measurement signal, the management device 110 may perform scheduling such that a base station adjacent to the base station does not transmit the measurement signal. As described above, the management device 110 may transmit to each base station a message including resource allocation information for each base station.

Hereinafter, although it is described that the management device 110 performs operations for configuring a beam of each base station and allocating a resource, the disclosure is not limited thereto. Some of the operations for determining the beam of each base station or allocating the resource according to various embodiments may be performed by a base station (e.g., the first base station 121, the second base station 122) to be described below or may be performed by a device of an upper node than the beam management device 110.

The management device 110 may be a network entity different from the first base station 121 or the second base station 122, as a separate deployment for a beamforming measurement configuration according to various embodiments. The management device 110 may be a network entity of an upper node than the first base station 121 and the second base station 122, or may be a separate device attached to the base station.

According to various embodiments of the disclosure, a relationship between the management device 110 and each base station (e.g., the first base station 121 or the second base station 122) may be applied to various scenarios which are possible in the separate deployment. For example, the management device 110 may be a device for controlling a TRP (e.g., a network controller) or a gNB, and the first base station 121 (or the second base station 122) may be the TRP. The management device 110 may determine a beam to be operated in each TRP, and may allocate a resource of a signal to be transmitted by each TRP.

For another example, the management device 110 may be a central unit (CU), and the first base station 121 (or the second base station 122) may be a distributed unit (DU) (or an access unit (AU)). That is, the management device 110 may be configured to perform a function of an upper layer (e.g., a packet data convergence protocol (PDCP), RRC) in a radio access network (RAN), and the first base station 121 or the second base station 122 may be configured to perform a function of a lower layer (e.g., a medium access control (MAC), Physical (PHY)).

For another example, the management device 110 may be a Digital Unit (DU) (or a baseband unit (BBU)), and the first base station 121 (or the second base station 122) may be a radio unit (RU) (or a remote radio head (RRH)).

For another example, the management device 110 may be a device included in a macro base station, and the first base station 121 (or the second base station 122) may be a small base station.

Meanwhile, unlike in FIG. 1, the management device 110 may be configured by being included in the first base station 121 or the second base station 122, as an integrated deployment. The management device 110 may be located in a specific base station (e.g., the first base station 121) to perform signaling for transmitting/receiving configuration information (e.g., beam information, scheduling information) with respect to a different base station (e.g., the second base station 122) in order to perform operations for a measurement configuration according to various embodiments.

The terminal 131 may move in the wireless communication environment 100. In order to provide a service based on mobility (e.g., L3 mobility) of the terminal 131, a procedure for measuring channel quality of a cell suitable for communication is used. The terminal 131 may measure channel quality in each cell. Each base station may transmit a signal for a measurement (hereinafter, a measurement signal). The base station may transmit the measurement signal using an operating beam of the base station. For example, the first base station 121 may transmit the measurement signal through each of the first beam 141, the second beam 142, and the third beam 143. The second base station 122 may transmit the measurement signal through the fourth beam 144, the fifth beam 145, and the sixth beam 146.

The terminal 131 may determine channel quality by measuring the measurement signal transmitted from each base station. The terminal 131 may perform a HandOver (HO) based on the measurement result. A situation of performing a handover from the first base station 121 which is a serving cell to the second base station 122 which is a target cell is described as an example. For example, the terminal 131 may transmit a measurement report based on the measurement result to the first base station 121 which is the serving cell. The first base station 121 may control the terminal 131 to perform a handover (hereinafter, a network-triggered HO) to the second base station 122 which is the target cell. For another example, the terminal 131 may determine the second base station 122 as the target cell according to the measurement result, and may immediately perform a handover (hereinafter, a UE-triggered HO). Hereinafter, although operations of the management device 110, the first base station 121, the second base station 122, and the terminal 131 are described by taking the network-triggered HO for example in the disclosure for convenience of explanation, premised operations (e.g., resource allocation, beam configuration, measurement signal transmission) may also be equally applied to the UE-triggered HO.

In a beamforming-based system, for a more accurate measurement in the terminal 131, a specific beam used in transmission of a corresponding measurement signal and a level of applying interference of a different signal may be considered. However, since an influence of interference caused by a beam of a neighboring beam is different in every measurement for each beam of the base station, it is difficult to perform a quality measurement for accurate comparison. Therefore, to perform an optimal handover (e.g., to perform a handover at an optimal time, or to avoid a ping-pong phenomenon), there is a desire for a method of reducing an influence of interference between neighboring cells or a deviation of interference between beams when a measurement signal is transmitted. Hereinafter, the disclosure describes a measurement configuration in which a management device configures a base station to transmit a measurement signal through different resources between neighboring base stations. According to various embodiments, the measurement configuration may include a beam configuration for operating beams of respective base stations to serve a designated path and a resource configuration for minimizing an influence of mutual interference of neighboring base stations. Since the interference between base stations is reduced by differently configuring a resource for each signal to be transmitted from the base station, an optimal handover can be performed.

Figure 2:
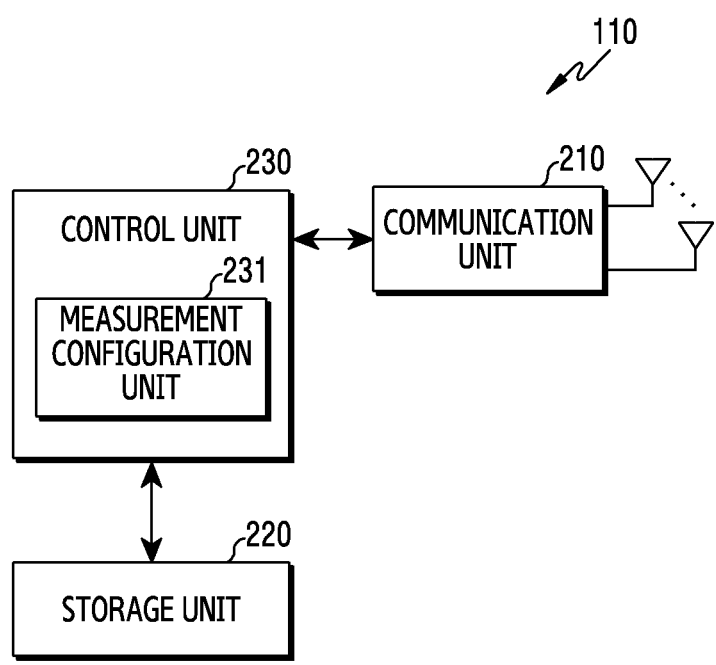
FIG. 2 illustrates a structure of a management device in a wireless communication system according to an embodiment of the disclosure.

FIG. 2 illustrates a structure of a management device in a wireless communication system according to various embodiments of the disclosure. The structure exemplified in FIG. 2 may be understood as a structure of the beam management device 110 of FIG. 1. Hereinafter, the term ' . . . unit', ' . . . device', or the like implies a unit of processing at least one function or operation, and may be implemented in hardware or software or in combination of the hardware and the software.

Referring to FIG. 2, the beam management device includes a communication unit 210, a storage unit 220, and a control unit 230.

The communication unit 210 may perform functions for transmitting/receiving information. Specifically, the communication unit 210 may provide an interface for performing communication with other nodes in a network. That is, the communication unit 210 converts a bit-stream transmitted from an operating device to a different node, e.g., a server, a sensor device, an upper network node, or the like, into a physical signal, and converts a physical signal received from the base station into a bit-stream.

The communication unit 210 may perform functions for transmitting/receiving a signal in a wired communication environment. The communication unit 210 may include a wired interface for controlling a direct connection between one device and another device via a transmission medium (e.g., a copper wire, an optical fiber). For example, the communication unit 210 may transfer an electrical signal to another device via the copper line, or may perform a conversion between the electrical signal and an optical signal.

The communication unit 210 may perform functions for transmitting/receiving a signal in a wireless communication environment. For example, the communication unit 210 may perform a function of conversion between a baseband signal and a bit-stream according to a physical layer standard of a system. In addition, the communication unit 210 may include a plurality of transmission/reception paths.

The communication unit 210 transmits and receives a signal as described above. Accordingly, the communication unit 210 may be referred to as a 'transmitter', a 'receiver', or a 'transceiver'. In addition, in the following description, transmission and reception are used to imply that the aforementioned process is performed by the communication unit 210.

According to various embodiments, the communication unit 210 may transmit measurement configuration information to each base station. The measurement configuration information may include information (hereinafter, beam configuration information) for a beam to be operated in a base station or information (hereinafter, resource allocation information) on a resource (e.g., a time resource, a spatial resource, a frequency resource, or an orthogonal code) allocated to a beam of each base station. According to various embodiments, the communication unit 210 may receive measurement information from each base station. The measurement information may be generated based on a measurement report received from a terminal served by each base station.

The storage unit 220 stores data such as a basic program, application program, configuration information, or the like for an operation of the operating device. The storage unit 220 may be constructed of a volatile memory, a non-volatile memory, or a combination of the volatile memory and the non-volatile memory. In addition, the storage unit 220 provides stored data according to a request of the control unit 230.

The control unit 230 controls overall operations of the operating device. For example, the control unit 230 transmits and receives a signal via the communication unit 210. In addition, the control unit 230 writes data to the storage unit 220, and reads the data. For this, the control unit 230 may include at least one processor. According to various embodiments, the control unit 230 may include a measurement configuration unit 231 for determining a beam of each base station controlled in a management device and for managing a resource for each beam. Hereinafter, operations of determining a beam for each base station of the management device and for allocating a resource may be referred to as a joint beam configuration, a measurement configuration, a beam pattern configuration, or the like. As an instruction set or code stored in the storage unit 220, the measurement configuration unit 231 may be an instruction/code temporarily resided in the control unit 230 or a storage space in which the instruction/code is stored, or may be a part of a circuitry which constitutes the control unit 230. According to various embodiments, the control unit 230 may control the operating device to perform operations based on various embodiments described below.

Although it is illustrated in FIG. 2 that the management device includes only the communication unit 210, a backhaul communication unit may be additionally included according to some embodiments. For example, when the management device controls a plurality of first base stations of an operating base station set and a different management device controls a plurality of second base stations of the operating base station set, the management device may perform signaling on resource allocation information via the different management device and the backhaul communication unit. For another example, when the management device is a network node for controlling TTPs and the base station corresponds to the TRP, the management device may perform signaling on the resource allocation information via a different network node and the backhaul communication unit.

Figure 3:
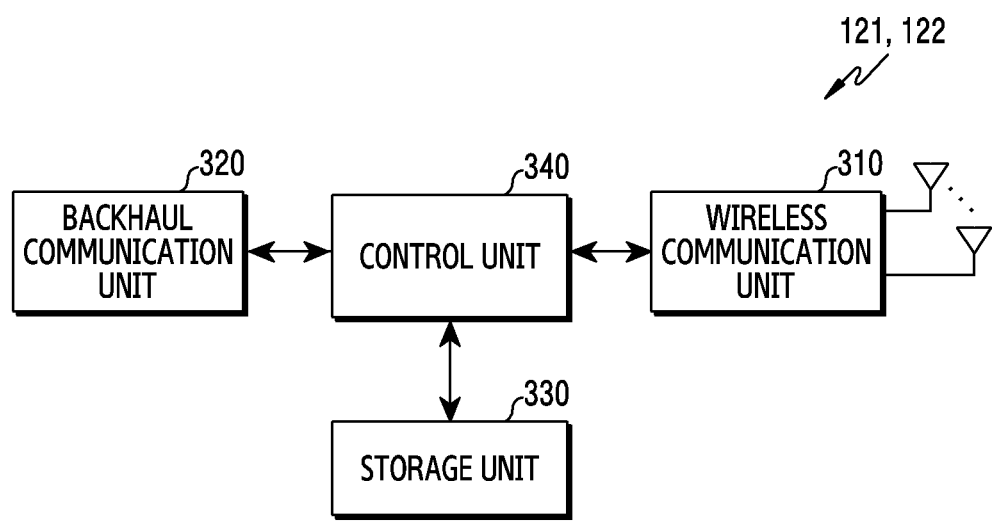
FIG. 3 illustrates a structure of a base station in a wireless communication system according to an embodiment of the disclosure.

FIG. 3 illustrates a structure of a base station in a wireless communication system according to an embodiment of the disclosure. The structure exemplified in FIG. 3 may be understood as a structure of the first base station 121 or the second base station 122. Hereinafter, the term ' . . . unit', ' . . . device', or the like implies a unit of processing at least one function or operation, and may be implemented in hardware or software or in combination of the hardware and the software.

Referring to FIG. 3, the base station includes a wireless communication unit 310, a backhaul communication unit 320, a storage unit 330, and a control unit 340.

The wireless communication unit 310 performs functions for transmitting and receiving a signal through a wireless channel. For example, the wireless communication unit 310 performs a function of conversion between a baseband signal and a bit-stream according to a physical layer standard of a system. For example, in data transmission, the wireless communication unit 310 generates complex symbols by coding and modulating a transmission bit-stream. In addition, in data reception, the wireless communication unit 310 restores a reception bit-stream by demodulating and decoding a baseband signal. In addition, the wireless communication unit 310 up-converts a baseband signal into a radio frequency (RF) signal and thereafter transmits it through an antenna, and down-converts an RF signal received through the antenna into a baseband signal.

For this, the wireless communication unit 310 may include a transmission filter, a reception filter, an amplifier, a mixer, an oscillator, a digital to analog converter (DAC), an analog to digital converter (ADC), or the like. In addition, the wireless communication unit 310 may include a plurality of transmission/reception paths. Further, the wireless communication unit 310 may include at least one antenna array constructed of a plurality of antenna elements. From a hardware aspect, the wireless communication unit 310 may be constructed of a digital unit and an analog unit, and the analog unit may be constructed of a plurality of sub-units according to operating power, operation frequency, or the like.

The wireless communication unit 310 transmits and receives a signal as described above. Accordingly, the wireless communication unit 310 may be referred to as a transmitter, a receiver, or a transceiver. In addition, in the following description, transmission and reception performed through a wireless channel are used to imply that the aforementioned processing is performed by the wireless communication unit 310.

The backhaul communication unit 320 provides an interface for preforming communication with different nodes (e.g., the management device 110 of FIG. 1) in a network. That is, the backhaul communication unit 320 converts a bit-stream transmitted from the base station to a different node, e.g., a different access node, a different base station, an upper node, a core network, or the like, into a physical signal, and converts a physical signal received from the different node into a bit-stream.

The storage unit 330 stores data such as a basic program, application program, configuration information, or the like for an operation of the base station. The storage unit 330 may be constructed of a volatile memory, a non-volatile memory, or a combination of the volatile memory and the non-volatile memory. In addition, the storage unit 330 provides stored data according to a request of the control unit 340.

The control unit 340 controls overall operations of the base station. For example, the control unit 230 may transmit and receive a signal via the wireless communication unit 310 or the backhaul communication unit 320. In addition, the control unit 340 writes data to the storage unit 330, and reads the data. In addition, the control unit 340 may perform functions of a protocol stack used in a communication standard. For this, the control unit 340 may include at least one processor. According to various embodiments, the control unit 340 may control the wireless communication unit 310 to transmit a measurement signal using a beam. The control unit 340 may receive a measurement report including a measurement result for the measurement signal from the terminal via the wireless communication unit 310. According to various embodiments, the control unit 340 may control the base station to perform operations based on various embodiments described below.

Although it is illustrated in FIG. 3 that the base station includes all of the wireless communication unit 310, the backhaul communication unit 320, the storage unit 330, and the control unit 340, some configurations or some functions may be modified, omitted, or added according to various embodiments. For example, when the management device controls TRPs and the base station corresponds to one TRP, the base station may not include the backhaul communication unit 320.

Figure 4:
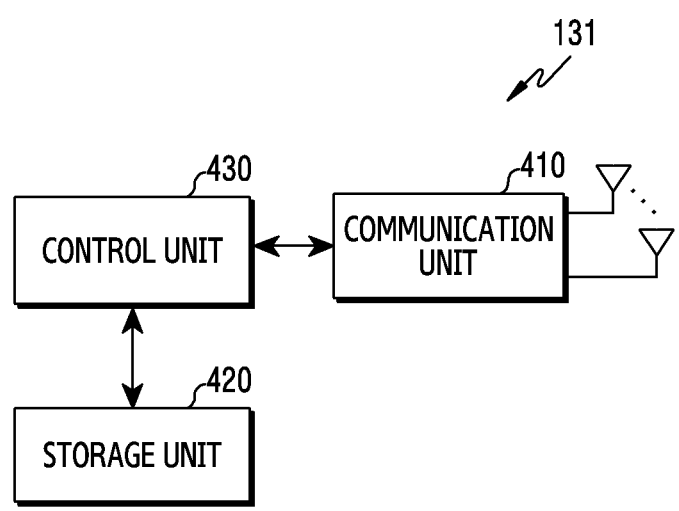
FIG. 4 illustrates a structure of a terminal in a wireless communication system according to an embodiment of the disclosure.

FIG. 4 illustrates a structure of a terminal (or a user equipment) in a wireless communication system according to an embodiment of the disclosure. The structure exemplified in FIG. 4 may be understood as a structure of the terminal 131. Hereinafter, the term ' . . . unit', ' . . . device', or the like implies a unit of processing at least one function or operation, and may be implemented in hardware or software or in combination of the hardware and the software.

Referring to FIG. 4 the terminal includes a communication unit 410, a storage unit 420, and a control unit 430.

The communication unit 410 performs functions for transmitting and receiving a signal through a wireless channel. For example, the communication unit 410 performs a function of conversion between a baseband signal and a bit-stream according to a physical layer standard of a system. For example, in data transmission, the communication unit 410 generates complex symbols by coding and modulating a transmission bit-stream. In addition, in data reception, the communication unit 410 restores a reception bit-stream by demodulating and decoding a baseband signal. In addition, the communication unit 410 up-converts a baseband signal into an RF signal and thereafter transmits it through an antenna, and down-converts an RF signal received through the antenna into a baseband signal. For example, the communication unit 410 may include a transmission filter, a reception filter, an amplifier, a mixer, an oscillator, a DAC, an ADC, or the like.

In addition, the communication unit 410 may include a plurality of transmission paths. Further, the communication unit 410 may include at least one antenna array constructed of a plurality of antenna elements. From a hardware aspect, the communication unit 410 may be constructed of a digital circuit and an analog circuit (e.g., a radio frequency integrated circuit (RFIC)). Herein, the digital circuit and the analog circuit may be implemented as one package. In addition, the communication unit 410 may include a plurality of RF chains. Further, the communication unit 410 may perform beamforming.

In addition, the communication unit 410 may include communication modules different from each other to process signals of frequency bands different from each other. Further, the communication unit 410 may include a plurality of communication modules to support a plurality of radio access technique different from each other. For example, the radio access techniques different from each other may include a bluetooth low energy (BLE), Wi-Fi, Wi-Fi Gigabyte (WiGig), a cellular network (e.g., long term evolution (LTE)), or the like. In addition, the frequency bands different from each other may include a super high frequency (SHF) (e.g., 2.5 GHz, 5 GHz) band and a millimeter wave (mm-Wave) (e.g., 38 GHz, 60 GHz, etc.) band. According to various embodiments, the communication unit 410 may receive a measurement signal transmitted from the base station. In addition, the communication unit 410 may transmit to the base station a measurement report including a measurement result for the measurement signal.

The communication unit 410 transmits and receives a signal as described above. Accordingly, the communication unit 410 may be referred to as a transmitter, a receiver, or a transceiver. In addition, in the following description, transmission and reception performed through a wireless channel are used to imply that the aforementioned processing is performed by the communication unit 410.

The storage unit 420 stores data such as a basic program, application program, configuration information, or the like for an operation of the terminal. The storage unit 420 may be constructed of a volatile memory, a non-volatile memory, or a combination of the volatile memory and the non-volatile memory. In addition, the storage unit 420 provides stored data according to a request of the control unit 430.

The control unit 430 controls overall operations of the terminal. For example, the control unit 430 may transmit and receive a signal via the communication unit 410. In addition, the control unit 430 writes data to the storage unit 420, and reads the data. In addition, the control unit 430 may perform functions of a protocol stack used in a communication standard. For this, the control unit 430 may include at least one processor or microprocessor, or may be a part of the processor. In addition, a part of the communication unit 410 or the control unit 430 may be referred to as a CP. The control unit 430 may include a plurality of modules for performing communication. According to various embodiments, the control unit 430 may measure a signal received from the base station. The measurement signal may be subjected to beamforming and may be transmitted from the base station to the terminal. The control unit 430 may perform a handover based on a measurement result. For example, the control unit 430 may generate a measurement report including the measurement result. For another example, the control unit 430 may transmit a signal to a target base station based on the measurement result. According to various embodiments, the control unit 430 may control the terminal to perform operations based on various embodiments described below.

Figure 5A:
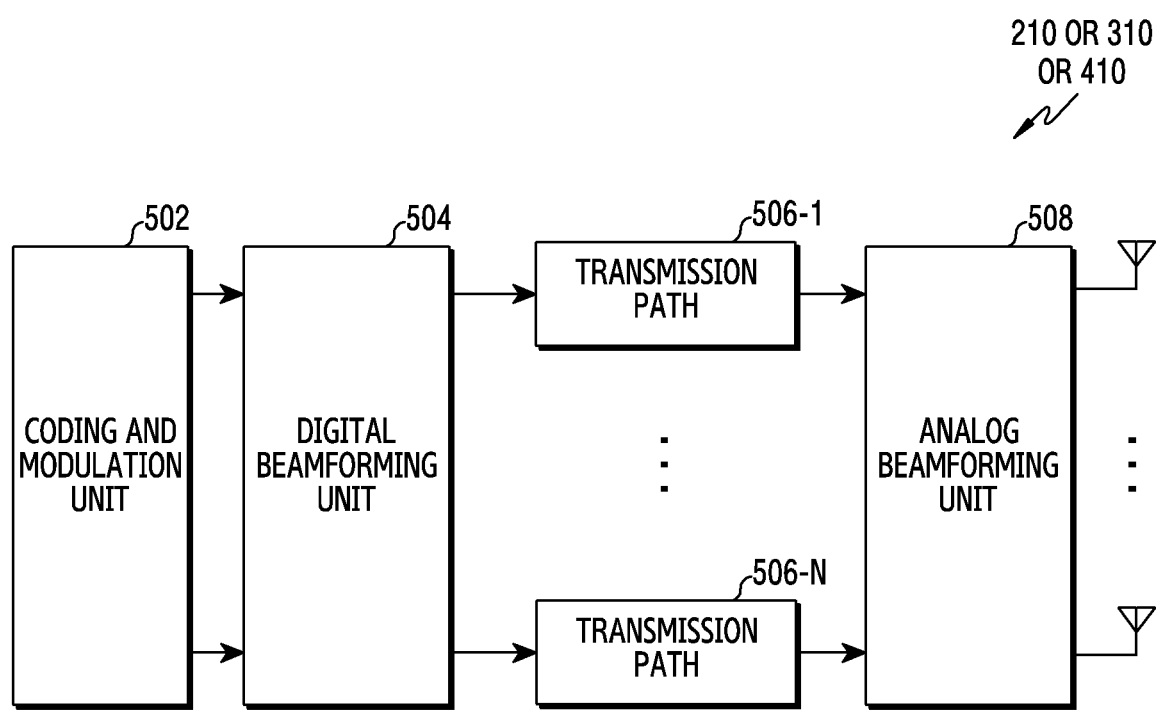
FIGS. 5A, 5B, and 5C illustrate a structure of a communication unit in a wireless communication system according to various embodiments of the disclosure.
Figure 5B:
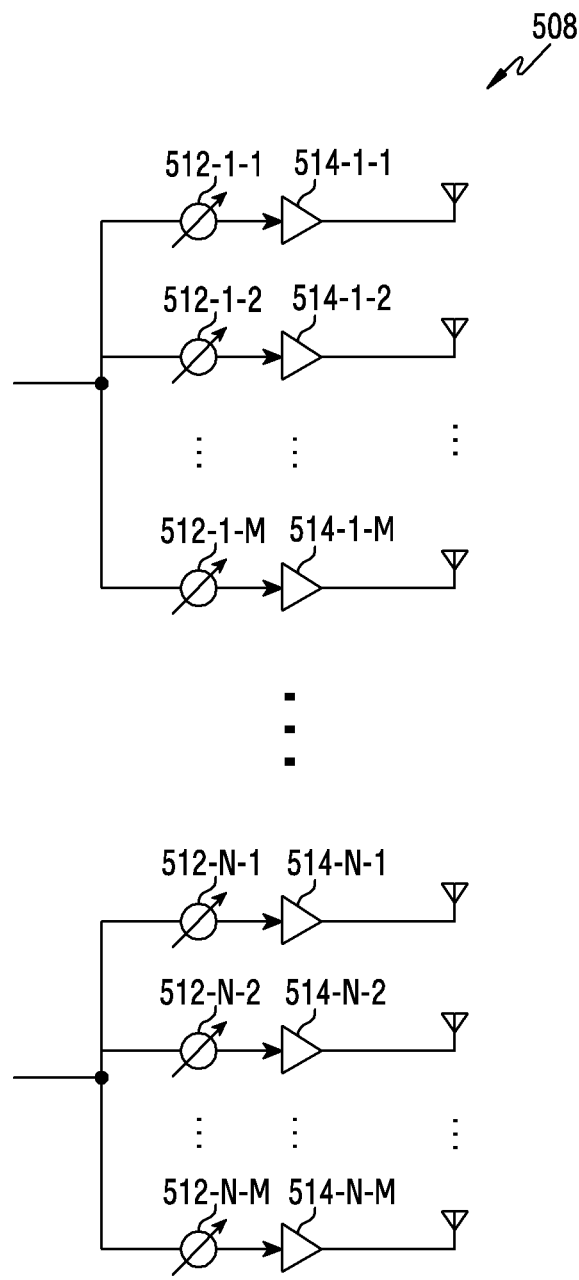
Figure 5C:
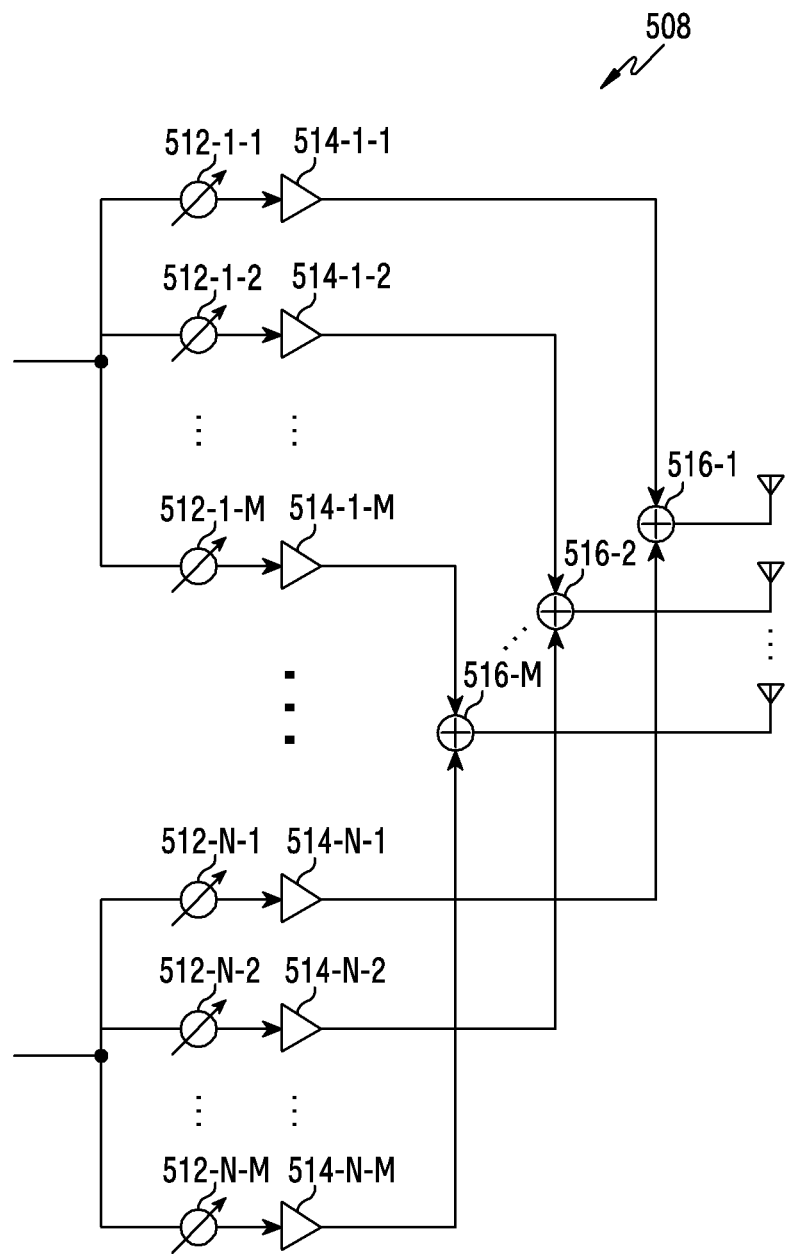

FIGS. 5A to 5C illustrate a structure of a communication unit in a wireless communication system according to various embodiments of the disclosure. An example for a detailed structure of the wireless communication unit 310 of FIG. 3 or the communication unit 410 of FIG. 4 is illustrated in FIGS. 5A to 5C. Specifically, constitutional elements for performing beamforming is exemplified in FIGS. 5A to 5C, as a part of the wireless communication unit 310 of FIG. 3 or the communication unit 410 of FIG. 4. According to some embodiments, constitutional elements of the communication unit 210 of FIG. 2 may be exemplified in FIGS. 5A to 5C.

Referring to FIG. 5A, the communication unit 210, the wireless communication unit 310, or the communication unit 410 includes a coding and modulation unit 502, a digital beamforming unit 504, a plurality of transmission paths 506-1 to 506-N, and an analog beamforming unit 508.

The coding and modulation unit 502 performs channel encoding. For the channel encoding, at least one of a low density parity check (LDPC) code, a convolution code, or a polar code may be used. The coding and modulation unit 502 generates modulation symbols by performing constellation mapping.

The digital beamforming unit 504 performs beamforming on a digital signal (e.g., modulation symbols). For this, the digital beamforming unit 504 multiplies the modulation symbols by beamforming weights. Herein, the beamforming weights are used to change a magnitude and phase of a signal, and may be referred to as a 'precoding matrix', a 'precoder', or the like. The digital beamforming unit 504 outputs modulation symbols subjected to digital beamforming to the plurality of transmission paths 506-1 to 506-N. In this case, according to a multiple input multiple output (MIMO) transmission scheme, the modulation symbols may be multiplexed, or the same modulation symbols may be provided to the plurality of transmission paths 506-1 to 506-N.

The plurality of transmission paths 506-1 to 506-N convert the digital signals subjected to digital beamforming into an analog signal. For this, each of the plurality of transmission paths 506-1 to 506-N may include an inverse fast fourier transform (IFFT) calculation unit, a cyclic prefix (CP) inserting unit, a DAC, an up-conversion unit. The CP inserting unit is for an orthogonal frequency division multiplexing (OFDM) scheme, and may be excluded when a different physical layer scheme (e.g., filter bank multi-carrier (FBMC)) is applied. That is, the plurality of transmission paths 506-1 to 506-N provide an independent signal processing process for a plurality of streams generated through digital beamforming. However, according to an implementation scheme, some of constitutional elements of the plurality of transmission paths 506-1 to 506-N may be commonly used.

The analog beamforming unit 508 performs beamforming on an analog signal. For this, the digital beamforming unit 504 multiplies the analog signals by beamforming weights. Herein, the beamforming weights are used to change a magnitude and phase of a signal. Specifically, according to a connection structure between the plurality of transmission paths 506-1 to 506-N and antennas, the analog beamforming unit 508 may be configured as shown in FIG. 5B or FIG. 5C.

Referring to FIG. 5B, signals input to the analog beamforming unit 508 are subjected to operations of phase/magnitude modification and amplification, and then are transmitted via the antennas. In this case, signals of respective paths are transmitted through different antenna sets, that is, antenna arrays. Regarding processing of a signal input through a first path, the signal is converted into a signal stream having a different or identical phase/magnitude by phase/magnitude modification units 512-1-1 to 512-1-M, is amplified by amplifiers 514-1-1 to 514-1-M, and thereafter are transmitted via the antennas. Regarding processing of a signal input through a Nth path, the signal is converted into a signal stream having a different or identical phase/magnitude by phase/magnitude modification units 512-N-1 to 512-N-M, is amplified by amplifiers 514-N-1 to 514-N-M, and thereafter are transmitted via the antennas.

Referring to FIG. 5C, signals input to the analog beamforming unit 508 are subjected to operations of phase/magnitude modification and amplification, and then are transmitted via the antennas. In this case, signals of respective paths are transmitted through different antenna sets, that is, antenna arrays. Regarding processing of a signal input through a first path, the signal is converted into a signal stream having a different or identical phase/magnitude by the phase/magnitude modification units 512-1-1 to 512-1-M, and is amplified by the amplifiers 514-1-1 to 514-1-M. Regarding processing of a signal input through a Nth path, the signal is converted into a signal stream having a different or identical phase/magnitude by the phase/magnitude modification units 512-N-1 to 512-N-M, and is amplified by the amplifiers 514-1-1 to 514-N-M. In addition, the amplified signals are added by adders 516-1 to 516-M with respect to an antenna element, and thereafter are transmitted via the antennas, so as to be transmitted via one antenna array.

An example in which an independent array is used for each transmission path is illustrated in FIG. 5B, and an example in which transmission paths share one antenna array is illustrated in FIG. 5C. However, according to another embodiment, some transmission paths may use an independent antenna array, and the remaining transmission paths may share one antenna array. Further, according to another embodiment, a structure which may change adaptively based on a situation may be used by applying a switchable structure between transmission paths and antenna arrays.

Hereinafter, operations of a management device and a base station (e.g., a serving base station, a neighboring base station, or a target base station) are described to transmit a measurement configuration and a measurement signal according to various embodiments with reference to FIG. 6 and FIG. 7. In the disclosure, the measurement configuration may include a beam configuration for configuring a beam in each base station and a resource configuration for allocating a resource.

Figure 6:
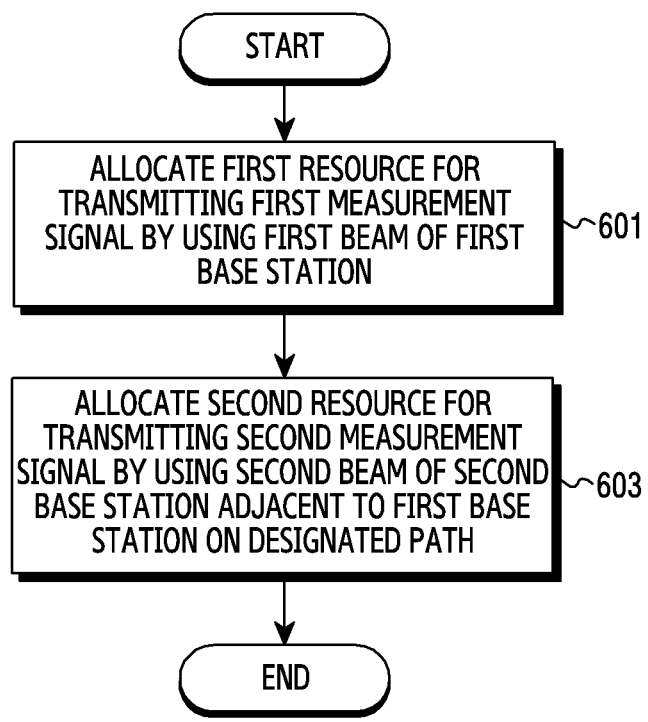
FIG. 6 is a flowchart of a beam management device for a measurement configuration in a wireless communication system according to an embodiment of the disclosure.

FIG. 6 is a flowchart of a beam management device (a management device) for a measurement configuration in a wireless communication system according to an embodiment of the disclosure. The management device is, for example, the management device 110 of FIG. 1. The management device may identify at least one beam to be operated in each base station. The management device may allocate a resource to each base station to transmit a measurement signal using each of operating beams. In other words, the management device may apply a beam configuration and a resource configuration to each base station for a measurement. In this case, the management device may configure the beam configuration and the resource configuration to minimize interference between base stations neighboring to each other.

A measurement signal may be a signal for measuring quality of a channel between the base station and the terminal. For example, the measurement signal may be at least one of a synchronization signal (SS) (e.g., an SS block), a beam reference signal (BRS), a beam refinement reference signal (BRRS), a cell-specific reference Signal (CRS), a channel state information-reference signal (CSI-RS), or a demodulation-reference signal (DM-RS). According to various embodiments, the base station may not only transmit one type of measurement signals but also transmit two or more types of measurement signals.

The base station may transmit the measurement signal for a measurement of the terminal. For example, the base station may transmit the measurement signal through a periodically designated resource. For another example, the base station may transmit the measurement signal by means of the terminal or the base station. The measurement signal transmitted by the base station to the terminal may be cell-specific, group-specific, or UE-specific. For example, a signal transmitted to a terminal served by the base station may be a UE-specific, and a signal transmitted by the base station for a measurement of a terminal served by a neighboring base station may be cell-specific. For another example, a signal transmitted by the base station may be group-specific. Herein, a group may be a set specified according to a management device for controlling the base stations or may be a set specified according to a designated path. The measurement signal may be generated based on an identifier for the group.

Referring to FIG. 6, in operation 601, the management device may allocate a first resource for transmitting a first measurement signal using a first beam of a first base station. For example, the first measurement signal may be a measurement signal transmitted through each of the first beam 141, second beam 142, and third beam 143 of the first base station 121 of FIG. 1. According to various embodiments, the first resource may be a time resource. For example, the management device may allocate the first resource to the first base station in unit of a symbol, a slot, a subframe, or a frame.

In operation 603, the management device may allocate a second resource for a second measurement signal using a second beam of a second base station adjacent to the first base station. For example, the second measurement signal may be a measurement signal transmitted through each of the fourth beam 144, fifth beam 145, and sixth beam 146 of the second base station 122 of FIG. 1.

According to various embodiments, the second base station may be a base station adjacent to the first base station on a designated path. The first base station and the second base station may be one of a plurality of base stations for serving the designated path. In other words, an operating base station set corresponding to the designated path may include the first base station and the second base station. The management device may control a plurality of base stations of the operating base station set. When base stations are arranged according to a designated path among the plurality of base stations on the designated path, that is, base stations included in the operating base station set, a base station adjacent to a specific base station may imply a base station located before a specific base station and/or a base station located after the specific base station within a threshold range. That is, the second base station may be a base station located within a threshold range of the first base station in the arrangement of base stations on a path on which a terminal being served is moving. In some embodiments, the threshold range may be configured to include only one adjacent base station. In some other embodiments, the threshold range may be configured based on an interval between base stations. In some other embodiments, the threshold range may be configured based on a movement speed of the terminal which is moving on the designated path.

According to various embodiments, the second resource may be a time resource. The second resource may be a time resource different from the first resource. For example, when a time resource allocated to the first base station is a first symbol, the management device may allocate the second symbol to the second base station.

According to various embodiments, the first beam of the first base station and the second beam of the second base station are configured to provide a service to a terminal on the designated path. In an embodiment, the first beam is configured by the first base station to transmit a signal to the terminal on the designated path. Also, the second beam is configured by the second base station to transmit a signal to the terminal on the designated path. For example, the first beam is identified by a plurality of beams of the first base station, and the second beam is identified by a plurality of beams the second base station.

According to various embodiments, the management device may configure the first base station such that the first base station does not use the first beam in the second time resource. Herein, the first beam may refer to a random beam (hereinafter, an operating beam) of the first base station among beams of a beam set configured to serve the terminal on the designated path. In some embodiments, the management device may configure the first base station such that no signal is transmitted by the first base station in the second time resource. The management device controls the first base station such that there is no interference caused by the first base station in transmission of a measurement signal of the adjacent second base station. In other words, the management device may not allocate the second time resource to the first base station. Likewise, the management device may configure the second base station such that no signal is transmitted by the second base station in the first time resource.

In some other embodiments, the management device may allocate the second resource to the first base station such that a measurement signal is transmitted through a beam of the first base station (hereinafter, an additional beam of the first base station), which is different from the first beam (hereinafter, an operating beam of the first base station) used in a first measurement signal. Herein, the additional beam of the first base station may be a beam of a region not overlapping spatially with an operating beam of the second base station for the designated path. For example, the additional beam of the first base station may be a beam for a path different from the designated path for the operating beam of the first base station. In other words, the additional beam of the first base station may be a beam for serving a path different from a path served by the first beam of the first base station, used in a first measurement signal, and the second beam of the second base station, used in a second measurement signal. Likewise, the management device may allocate the first time resource to the second base station such that a measurement signal is transmitted through a beam of the second base station (hereinafter, an additional beam of the second base station), which is different from the second beam used in the second measurement signal.

Figure 7:
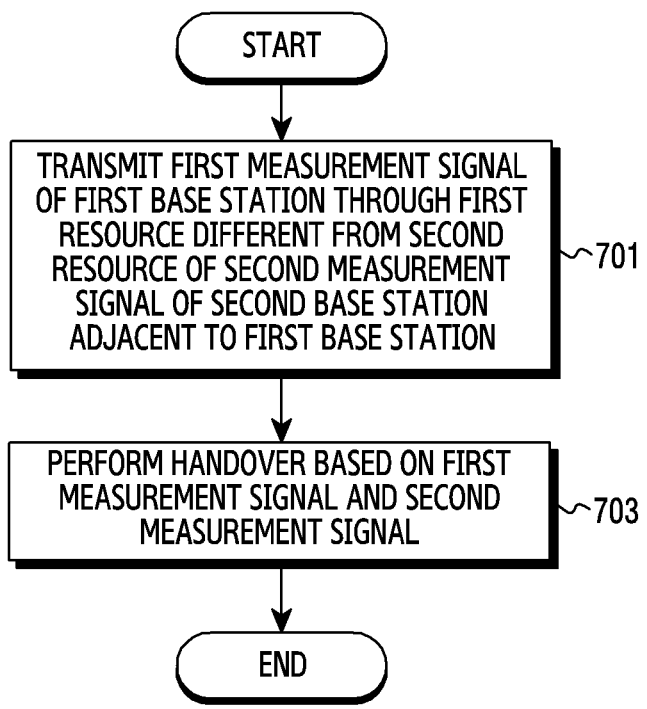
FIG. 7 is a flowchart of a base station in a wireless communication system according to an embodiment of the disclosure.

FIG. 7 is a flowchart of a base station in a wireless communication system according to an embodiment of the disclosure. The base station exemplifies the first base station 121 (or the second base station 122) of FIG. 1.

In operation 701, the first base station may transmit a first measurement signal of a first base station through a first resource different from a second resource of a second measurement signal of a second base station adjacent to the first base station.

The first base station may identify a first beam among operable beams. The first beam may be included in an operating beam set which is a set of beams for serving a designated path. The second base station adjacent to the first base station may be a base station arranged before the first base station or after the first base station among a plurality of base stations of an operating base station set configured to serve the designated path. According to various embodiments, the first base station may identify the first beam based on a control message received from a management device. The control message may indicate the first beam to be operated to serve the designated path among the operable beams. The control message may be referred to as a beam configuration message.

The first base station may transmit a first measurement signal through the first beam. Herein, the first resource may be a time resource. The first resource may be a time region different from the second resource. For example, the first resource may be a symbol different from the second resource. For another example, the first resource may be a slot different from the second resource. For another example, the first resource may be a subframe different from the second resource. For another example, the first resource may be a frame different from the second resource. According to various embodiments, since the first base station transmits a measurement signal in the allocated first resource, the measurement signal may not be transmitted in the second resource which is not allocated. In other words, the first base station may be configured to not transmit a first measurement signal in the second resource allocated to the adjacent second base station.

In some embodiments, in order to increase resource efficiency, the first base station may be additionally configured in the second resource to transmit a signal through an additional beam which is spatially identified from a beam used for the designated path in the second base station. The beam spatially identified may be a beam included in an operating beam set for an additional path.

In operation 703, the first base station may perform a handover based on a first measurement signal and a second measurement signal.

The handover may be performed based on the first measurement signal and the second measurement signal. Similarly to the first base station, the second base station may transmit the second measurement signal. A situation is described in which a serving base station of the terminal is the first base station, and a neighboring base station of the terminal is the second base station.

The terminal may determine channel quality by measuring a received signal. For example, the terminal may measure the first measurement signal of the first base station to determine channel quality of a serving cell. The terminal may measure the second measurement signal of the second base station to determine channel quality of a neighboring cell. In addition to beam reference signal receiver power (BRSRP) and reference signal received power (RSRP), the channel quality may be at least one of reference signal received quality (RSRQ), received signal strength indicator (RSSI), signal to interference and noise ratio (SINR), carrier to interference and noise ratio (CINR), signal to noise ratio (SNR), error vector magnitude (EVM), bit error rate (BER), or block error rate (BLER).

In some embodiments, the terminal may measure different types of measurement signals when the channel quality of the serving cell is measured and when the channel quality of a neighboring cell is measured. For example, the terminal may determine the channel quality of the serving cell by measuring CSI-RS transmitted from the serving cell, and may determine the channel quality of the neighboring cell by measuring a synchronization signal transmitted from the neighboring cell. In some other embodiments, the terminal may measure channel quality through the same type of measurement signals both in the serving cell and the neighboring cell. For example, the terminal may determine the channel quality of the serving cell by measuring a synchronization signal (SS) transmitted from the serving cell, and may determine the channel quality of the neighboring cell by measuring an SS transmitted from the neighboring cell.

As described above, since the second measurement signal is not transmitted from the neighboring base station at a time when the terminal receives the first measurement signal, the terminal may measure quality of the first measurement signal (e.g., received signal strength) in a situation in which interference is minimized. Likewise, since the first measurement signal is not transmitted from the serving base station at a time when the terminal receives the second measurement signal, the terminal may measure quality of the second measurement signal in a situation in which interference is minimized. Although only the serving base station and one neighboring base station are described for example, a configuration in which two adjacent nodes are configured to not transmit signals in the same time resource may also be equally applied to the serving base station and a plurality of neighboring base stations adjacent to the serving base station.

In case of a network-triggered handover, the terminal may compare the channel quality of the serving cell and the channel quality of the neighboring cell to transmit a measurement report to the serving base station when a predetermined event occurs. The first base station may perform a handover based on the measurement report received from the terminal. The first base station may control the terminal to perform the handover to the second base station which is a target base station. In case of a UE-triggered handover, the terminal may compare the channel quality of the serving cell and the channel quality of the neighboring cell to trigger a handover when a predetermined event occurs. The terminal may perform a handover from the serving base station to the target base station.

Since each base station transmits a measurement signal through a not-overlapping resource, the terminal may measure channel quality of a specific base station in a state where influence of interference of another base station is minimized. That is, since the terminal acquires a measurement result of a base station in which influence of an interference deviation for each beam of a different base station is decreased, the terminal may be handed over at a more accurate time.

Figure 8:
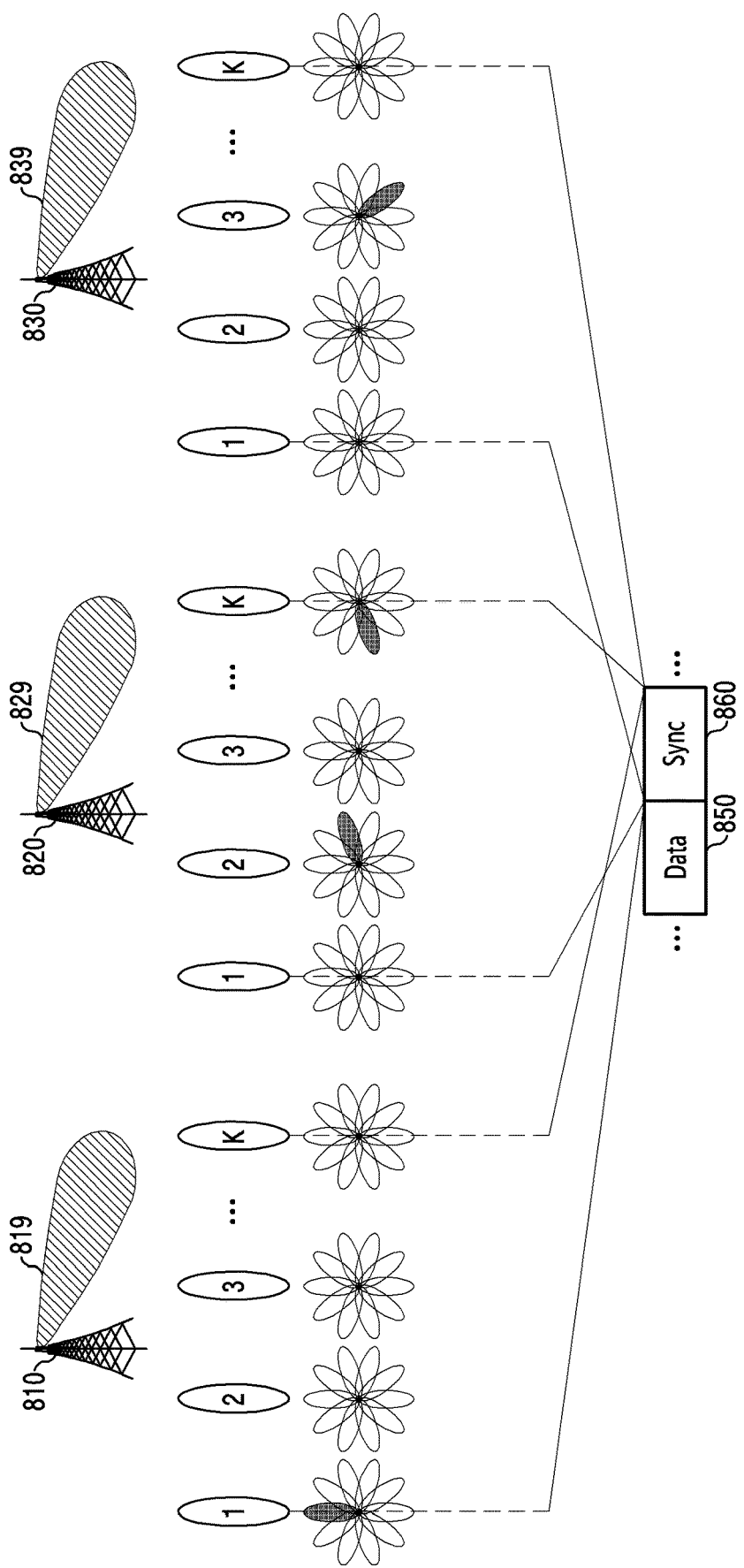
FIG. 8 illustrates an example of a resource configuration in a wireless communication system according to an embodiment of the disclosure.

FIG. 8 illustrates an example of a resource configuration in a wireless communication system according to an embodiment of the disclosure. The resource configuration may be referred to as joint beam scheduling.

Referring to FIG. 8, a situation is described in which a first base station 810, a second base station 820, and a third base station 830 are located on a designated path. To serve a terminal which is moving on the designated path, a beam may be configured for each of the first base station 810, the second base station 820, and the third base station 830. For example, a first beam 819, a second beam 829, and a third beam 839 may be configured respectively for the first base station 810, the second base station 820, and the third base station 830 to serve the terminal which is moving on the designated path. In some embodiments, a management device may configure a beam of each of the first base station 810, the second base station 820, and the third base station 830, and may transmit to each base station a message for informing the configured beam. In some other embodiments, each base station may identify an operating beam of each base station based on predetermined information or information received from the management device.

A time region may include a data transmission duration 850 and a measurement duration 860. In some embodiments, the data transmission duration 850 may be referred to as a data subframe. The measurement duration 860 may be referred to as a sync subframe or a measurement subframe. The sync subframe is a subframe in which channel measurement of the terminal is performed, and the data subframe is a subframe in which data is transmitted. The data transmission duration 850 or the measurement duration 860 may be repeated in the entire time region. Although it is illustrated in FIG. 8 that the data subframe and the sync subframe are consecutive, the disclosure is not limited thereto. A gap (e.g., four subframes) may temporally exist in the synch subframe in which channel measurement is performed and the data subframe in which data is transmitted or received in a base station and which is determined according to a channel measurement result.

The base station may transmit a measurement signal by varying beams of the base station in the measurement duration 860. For example, the base station may transmit the measurement signal by varying a beam for every symbol in the sync subframe. The base station may transmit the measurement signal by changing a direction of the beam in each symbol. In this case, the terminal may measure reception strength of the measurement signal for each beam of the base station in a fixed direction. In case of scheduling beams by considering only one base station, that is, in case of not considering a beam of an adjacent cell, there may be an interference deviation in a measurement result of each beam of the base station. Therefore, a method of scheduling a beam of base stations by considering influence of a beam of an adjacent cell is described in the disclosure so that a beam for a region corresponding to a region in which the terminal is expected to enter is not interfered due to the beam of the adjacent cell.

The first base station 810 may transmit the measurement signal in a first symbol of the sync subframe using the first beam 819. The second base station 820 may not transmit the measurement signal in the first symbol of the sync subframe using the second beam 829. That is, the second base station 820 may be configured to not transmit the measurement signal using the first beam 819 in a time resource allocated to the first beam 819 of the first base station 810 adjacent to the second base station 820.

The second base station 820 may transmit the measurement signal in a second symbol of the sync subframe using the second beam 829. The first base station 810 may be configured to not transmit the measurement signal in the second symbol of the sync subframe using the first beam 819. The third base station 830 may be configured to not transmit the measurement signal in the second symbol of the sync subframe using the third beam 839. That is, the second base station may be configured to transmit the measurement signal in a time resource allocated to the first beam 819 of the first base station 810 adjacent to the second base station 820 and a time resource different from a time resource allocated to the third beam 839 of the third base station 830 adjacent to the second base station 820.

The first base station 810 may be configured to not transmit the measurement signal using the first beam 819 in a time resource allocated to the second beam 829 of the second base station 820 adjacent to the first base station 810, that is, in the second symbol of the sync subframe. Likewise, the third base station 830 may be configured to not transmit the measurement signal using the third beam 839 in a time resource allocated to the second beam 829 of the second base station 820 adjacent to the third base station 830, that is, in the second symbol of the sync subframe.

The third base station 830 may transmit the measurement signal in a third symbol of the sync subframe using the third beam 839. The second base station 820 may be configured to not transmit the measurement signal in the third symbol of the sync subframe using the second beam 829. That is, the second base station 820 may be configured to not transmit the measurement signal using the second beam 829 in a time resource allocated to the third beam 839 of the third base station 830 adjacent to the second base station 820.

As disclosed through the aforementioned examples, according to various embodiments, each base station may be configured to not transmit a measurement signal in a time resource allocated to transmit a signal by an adjacent base station.

A magnitude of a resource (e.g., the number of symbols) allocated to an operating beam of each base station may be determined according to the number of adjacent base stations of each base station. Herein, the number of adjacent base stations of the specific base station may be defined as the number of base stations which interfere the specific base station with at least a specific level when a signal is transmitted. For example, the number of adjacent base stations may be determined based on the number of base stations controlled by the management device. For another example, the number of adjacent base stations may be determined based on a range determined by the user (hereinafter, a threshold range) among the number of base stations included in an operating base station set determined to serve a designated path. For example, if the threshold range determined by the user is 1, two base stations located before the specific base station and one base station located after the specific base station may be respective adjacent base stations on the designated path. The number of adjacent base stations may be 2.

The greater the number of adjacent base stations, the less the number of resources allocated to a measurement signal for one base station in a fixed sync subframe. For example, if the number of adjacent base stations is 14, each base station may transmit a measurement signal on one of 14 symbols in one sync subframe. Each base station may transmit the measurement signal through one operating beam. If the number of adjacent base stations is 7, each base station may transmit the measurement signal on two symbols. Each base station may transmit the measurement signal through each of two operating beams.

It is illustrated in FIG. 8 that, when one base station transmits a measurement signal, an adjacent base station does not transmit the measurement signal. However, the disclosure is not limited thereto. Base stations not adjacent to each other within a specific range on a designated path, for example, the first base station 810 and the third base station 830, may transmit a measurement signal using each beam in a first symbol according to a distance between the base stations. In this case, the first beam 819 and the third beam 839 may not overlap with each other, or may overlap such that a mutual interference level is less than a threshold. The first base station 810 may not be an adjacent base station of the third base station 830.

In some embodiments, the management device may additionally allocate a resource allocated to an adjacent base station of the base station to the base station in consideration of a distance between the base stations, a channel environment of beams of the base station, or the like. In this case, a path served through the additionally allocated resource may be a path different from a path served through a previously allocated resource. A beam used to transmit a signal through the additionally allocated resource may be a beam which is spatially divided from each of beams of a beam set for a designated path served through the previously allocated resources.

Although not shown in FIG. 8, a measurement environment may be configured such that a measurement signal at each base station is transmitted through a different time resource based on a type of the measurement signal. That is, a resource region in which the measurement signal is transmitted may be determined according to a type of the measurement signal. In some embodiments, if channel quality of a neighboring cell is measured, it may be configured to measure a measurement signal of a first type (e.g., a CSI-RS) and measure a measurement signal of a second type (e.g., a sync signal), thereby reducing an influence of interference between a serving cell and a neighboring cell. A time resource (e.g., a symbol) on which the measurement signal of the first type is transmitted may be a first designated region (e.g., sixth and seventh symbols of each slot) in a subframe, and a time resource on which the measurement signal of the second type is transmitted may be a second designated region (e.g., first to fourth symbols of a second slot) in the subframe. Accordingly, the terminal may measure channel quality of the serving cell in a situation in which there is no interference caused by the neighboring cell. Each neighboring base station may be configured to not transmit a signal in a time resource on which the measurement signal of the first type is transmitted.

Meanwhile, a resource configuration (or joint beam scheduling) according to various embodiments of the disclosure may be applied not only in a duration (e.g., a sync subframe) for discovering an optimal beam but also in a duration for transmitting data. Hereinafter, a resource configuration in the duration for transmitting data is described with reference to FIG. 9.

Figure 9:
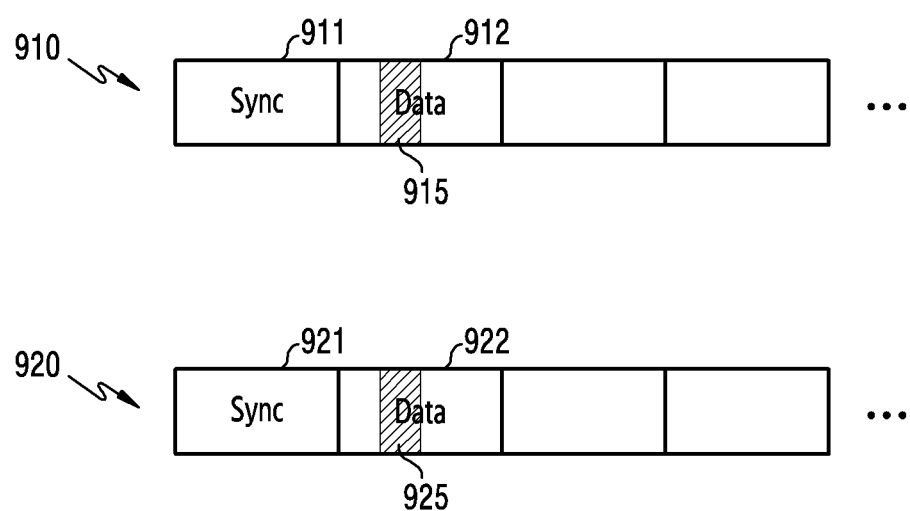
FIG. 9 illustrates another example of a resource configuration according to an embodiment of the disclosure.

FIG. 9 illustrates another example of a resource configuration according to an embodiment of the disclosure.

Referring to FIG. 9, a first time region 910 is a time region for a first base station, and may include a first sync subframe 911 and a first data subframe 912. A second time region 920 is a time region for a second base station, and may include a second sync subframe 921 and a second data subframe 922. The first sync subframe 911 and the second sync subframe 921 are divided for each base station only for convenience of explanation, and thus imply the same time region. The first data subframe 912 and the second data subframe 922 also imply the same time region. A situation is described in which a terminal moves to be handed over from the first base station which is a serving base station of the terminal to the second base station which is a target base station. An operating base station set for a designated path on which the terminal moves may include the first base station and the second base station.

The first base station may transmit a first measurement signal in the first sync subframe 911 using a first beam. The first base station may transmit data to a terminal served by the first base station in the first data subframe 911 using the first beam. The second base station may transmit a second measurement signal in the second sync subframe 921 using a second beam. The terminal which is moving on the designated path may perform a handover based on the first measurement signal and the second measurement signal.

The second base station which is the target base station and the terminal to be handed over to the second base station may perform control signaling for a connection (e.g., a RRC connection). For example, the terminal may perform a random access procedure with respect to the second base station. The terminal may transmit a random access preamble to the second base station. The second base station may transmit a random access response to the terminal. The terminal may transmit to the second base station a message (hereinafter, msg3) including an identity of the terminal. The second base station may transmit a contention resolution message (hereinafter, msg4) to the terminal. In this case, an uplink reception beam of the second base station may be identified or an uplink transmission beam of the terminal may be identified through a procedure in which the terminal transmits a message to the second base station during random access, that is, a procedure of transmitting a random access preamble or a procedure of transmitting the msg3.

To find an optimal reception beam of the second base station in an uplink or to identify an uplink transmission beam of the terminal, the terminal or base station may perform a measurement. Similarly to downlink measurements of the respective base stations, a method for minimizing interference of the first base station which is an adjacent base station during control signaling of the second base station is used to reduce a deviation of interference between beams. According to various embodiments, the first base station which is a previous serving base station may be configured to not perform beamforming during a specific duration 925 within the second data subframe 922 in which the terminal performs a random access procedure, that is, during a specific duration of the first data subframe 911. For example, the first base station may be configured to not transmit data using the first beam in the specific duration 915.

Although the random access procedure is described for example, it may be applied to all procedures of transmitting a signal in a data subframe in addition to the random access procedure. The first base station (a base station except for a target base station) may be configured to not transmit a signal during a specific duration in the data subframe.

A method for scheduling a beam operated in each base station has been described with reference to FIG. 8 and FIG. 9. Since a signal cannot be transmitted through a beam in a part of a designated duration, a beam may be searched for within a limited time. That is, a procedure of identifying an operating beam among all beams is used since it is not feasible to search all available beams. A management device may identify the operating beam of each base station to configure an optimal measurement environment. According to various embodiments, the management device may configure an operating beam at each base station, based on at least one of a designated path served by a plurality of base stations coupled to the management device, a distance between adjacent base stations, a movement speed (e.g., a range or average of a movement speed) of a terminal which moves on the designated path, an antenna configuration of the terminal, or an antenna configuration of the base station. Hereinafter, an example of a beam configuration procedure for each base station of the management device is described with reference to FIG. 10 and FIG. 11.

Figure 10:
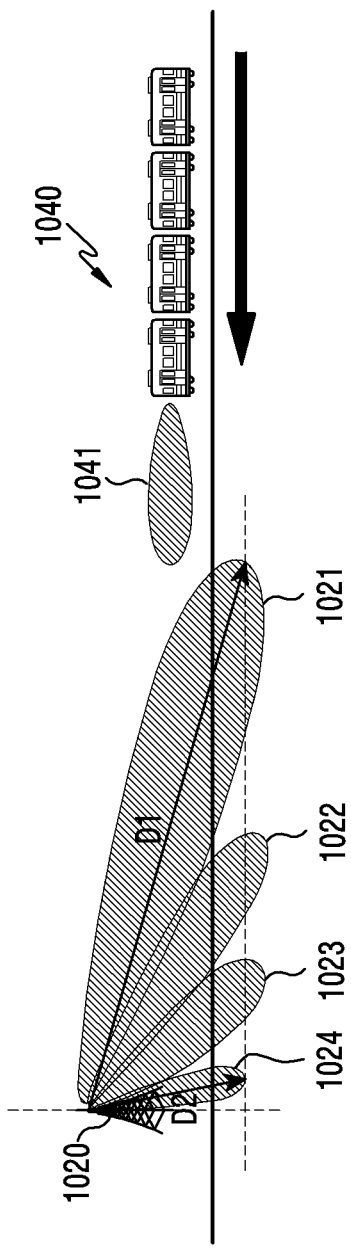
FIG. 10 illustrates an example of a beam configuration according to an embodiment of the disclosure.

FIG. 10 illustrates an example of a beam configuration according to an embodiment of the disclosure.

Referring to FIG. 10, an operating beam of a base station 1020 may be configured to serve a terminal which is moving on a designated path. A situation is described in which a train 1040 including a terminal moves along a railway towards a base station 1020. A management device for controlling the base station 1020 may configure the operating beam of the base station 1020.

According to various embodiments, the management device may configure the operating beam of the base station 1020 based on a movement direction of the train 1040. The train 1040 may receive a signal of the base station 1020 using an antenna attached to a front portion of the train 1040. The train 1040 may generate a beam 1041 in a progressing direction. The beam of the base station 1020 may be configured based on the progressing direction of the train 1040, that is, a direction in which the train 1040 approaches.

In some embodiments, a direction of an operating beam and the number of operating beams may be configured in the base station 1020 based on an antenna configuration (e.g., a height of an antenna, the number of antennas, a type of an array) of the base station 1020, an operable beam width, or a location or distance information (a region which is to be covered by one base station) of the base station 1020.

For example, a direction of the operating beam of the base station 1020 may be determined as an angle less than 90 degrees with respect to a vertical line of the antenna of the base station 1020. In addition, the direction of the operating beam of the base station 1020 may be determined as an angle greater than 0 degree with respect to the vertical line of the antenna of the base station 1020.

For example, the number of operating beams of the base station 1020 may be determined based on a boundary angle and an operable beam width. Herein, the boundary angle refers to an angle constituted by a beam, which constitutes a greatest angle with respect to the vertical line of the antenna of the base station 1020, with respect to the vertical line among beams operable in the base station 1020. For example, the boundary angle may be determined based on a length of the designated path covered by the base station 1020 and a height of the base station 1020. When a distance between base stations is 500 meters (m) and a height of the vertical line is 10 m, the boundary angle of the base station 1020 may be determined as a value of arctan(500/10). The number of operating beams of the base station 1020 may be determined within a specific range from a value obtained by dividing the boundary angle by the beam width. For example, the number of operating beams of the base station 1020 may be determined based on Equation (1) below.

$$N = \left\lfloor \frac{A1}{BW} \right\rfloor \quad (1)$$

N denotes the number of operating beams of the base station 1020, A1 denotes a boundary angle, and BW denotes a beam width of a beam of the base station 1020. $\lfloor \cdot \rfloor$ denotes a floor function. If the beam width is 20 degrees, the base station 1020 may be configured to operate four beams according to $$\left\lfloor \frac{\tan^{-1} \frac{500}{10}}{20} \right\rfloor.$$

As shown in FIG. 10, the base station 1020 may be configured to operate four beams (e.g., a first beam 1021, a second beam 1022, a third beam 1022, a third beam 1023, and a fourth beam 1024) to serve a terminal (other communication device) in the train 1040 which is moving within a designated path.

For another example, the number of operating beams of the base station may be determined based on Equation (2) below.

$$N = \left\lceil \frac{A1}{BW} \right\rceil \quad (2)$$

N denotes the number of operating beams of the base station 1020, A1 denotes a boundary angle, and BW denotes a beam width of a beam of the base station 1020. $\lceil \cdot \rceil$ denotes a ceiling function.

A procedure of configuring a beam of each base station, that is, a beam configuration, may be performed by a management device for controlling base stations which serve a designated path. Although it is described in the disclosure that the management device performs the beam configuration, the base station may perform a part of the beam configuration procedure by receiving preliminary information (e.g., a distance between base stations, information on a moving train) from the management device or according to previously input information (e.g., an antenna height, beam width information).

The management device may determine the number of operating beams using a plurality of boundary angles. For example, the management device may determine the number of operating beams of the base station using both of an angle (hereinafter, a lower boundary angle D2) constituted by a beam which constitutes a smallest angle with respect to a vertical line of the antenna of the base station among beams of the base station, and an angle (hereinafter, an upper boundary angle D1) constituted by a beam which constitutes a greatest angle. The management device may determine the number of operating beams based on a difference between the upper boundary angle and the lower boundary angle and the beam width.

In the example described with reference to FIG. 10, the antenna of the train 1040 is attached only to the front portion of the train 1040 and thus a reception beam is formed only in a proceeding direction. In this case, when the train 1040 moves in an opposite direction, it is difficult to configure a smooth measurement environment when the aforementioned beam configuration is directly applied at each base station. Therefore, the management device according to various embodiments may operate a plurality of operating beam sets or a plurality of operating base stations based on a movement direction of the terminal at each base station. When the train 1040 of FIG. 10 moves in the opposite direction, the management device may configure each base station to transmit a measurement signal through an operating beam included in different operating beam sets, or may control different base stations to transmit a measurement signal by controlling the different base stations included in the different operating base station set.

Alternatively, a different beam configuration may also be considered in a case where the antenna configuration of the train 1040 varies. Hereinafter, an example of a beam configuration in which a management device configures a beam of a base station based on the antenna configuration of the train 1040 is described.

Figure 11:
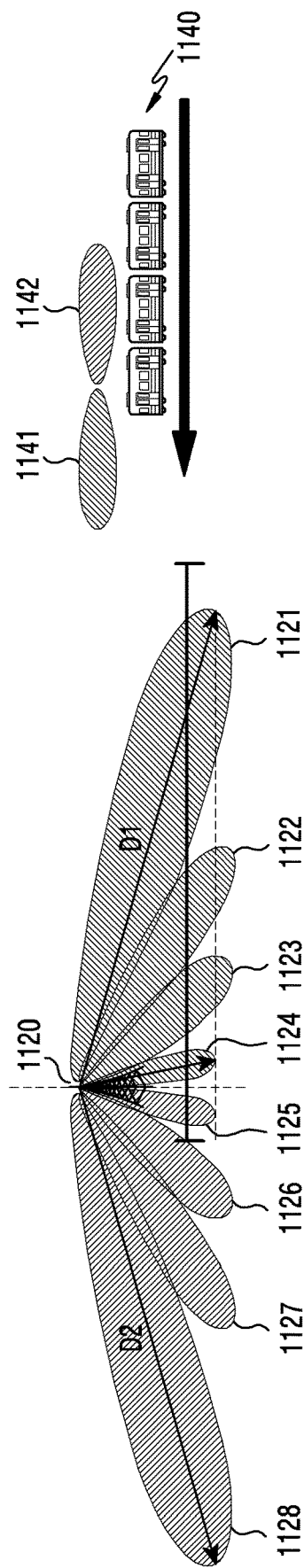
FIG. 11 illustrates another example of a beam configuration according to an embodiment of the disclosure.

FIG. 11 illustrates another example of a beam configuration according to an embodiment of the disclosure.

Referring to FIG. 11, an operating beam of a base station 1120 may be configured to serve a terminal which is moving on a designated path. A situation is described in which a train 1140 including a terminal moves along a railway towards a base station 1120. A management device for controlling the base station 1120 may configure the operating beam of the base station 1120.

According to various embodiments, the management device for controlling the base station 1120 may configure the operating beam of the base station 1120 based on an antenna configuration of the train 1140. For example, unlike in the train 1040 of FIG. 10, the train 1140 may include an antenna which supports a plurality of directivities. For example, the antenna of the train 1140 may form a reception beam of a direction opposite to a progressing direction. The train 1140 may receive a signal of the base station 1120 through an antenna attached to a lateral portion or upper portion of the train 1140. For example, the train 1140 may generate a first beam 1141 in the progressing direction of the train 1140 and a second beam 1142 in a direction opposite to the progressing direction.

The management device may receive information on the antenna configuration of the train 1140. For example, the management device may receive information on an antenna configuration from a base station to which the train 1140 has access. When accessing the base station, the terminal may transmit a message (e.g., an RRC message) including the information on the antenna configuration. For example, when an RRC connection is generated, the terminal may transmit the information on the antenna configuration to the base station by including the information into UE capability information. The information on the antenna configuration may include the number of beams which are operable by the terminal, information on the number of beams spatially divided, the number of antennas spatially separated, or the number of antenna arrays.

In some embodiments, the operating beam and the number of operating beams may be configured in the base station 1120 based on an antenna configuration (e.g., a height of an antenna, the number of antennas, a type of an array) of the base station 1120, an operable beam width, a location or distance information (a region which is to be covered by one base station) of the base station 1120, and an antenna configuration of the train 1140. Unlike in the base station 1020 of FIG. 10, a region which is to be covered by each base station and an operating base station set based thereon may be configured according to the antenna configuration for the train 1140.

For example, a direction of the operating beam of the base station 1120 may be determined within an angle less than 90 degrees and greater than −90 degrees with respect to a vertical line of the antenna of the base station 1120.

For example, the number of operating beams of the base station 1120 may be determined based on a boundary angle and an operable beam width. Herein, the boundary angle refers to an angle constituted by a beam, which constitutes a greatest angle with the vertical line of the antenna of the base station 1120, with respect to the vertical line among beams operable in the base station 1120. For example, the boundary angle may be determined based on a length of the designated path covered by the base station 1120 and a height of the base station 1120. When a distance between base stations is 500 meters (m) and a height of the vertical line is 10 m, the boundary angle of the base station 1120 may be determined as a value of arctan(500/10).

For example, the management device may determine the number of operating beams of the base station 1120 according to Equation (3) below.

$$N = 2 \times \left\lfloor \frac{A1}{BW} \right\rfloor \quad (3)$$

N denotes the number of operating beams of the base station 1120, A1 denotes a boundary angle, and BW denotes a beam width of a beam of the base station 1120. If the beam width is 20 degrees, the management device may configure the base station 1120 to operate 8 beams according to $$2 \times \left\lfloor \frac{\tan^{-1} \frac{500}{10}}{20} \right\rfloor.$$

As shown in FIG. 11, the base station 1120 may be configured to operate 8 beams (e.g., a first beam 1121, a second beam 1122, a third beam 1122, a third beam 1123, a fourth beam 1124, a fifth beam 1125, a sixth beam 1126, a seventh beam 1127, and an eighth beam 1128) to serve terminals in the train 1140 which is moving within a designated path.

The embodiments exemplified in FIG. 10 and FIG. 11 may include a situation in which, when a base station provides data to an antenna in the train, the train serves a user terminal in the train as a relay node or serves the user terminal in the train by switching to another radio access technology (RAT) (e.g., Wi-Fi).

A procedure in which a signal is not transmitted in a time resource allocated to a neighboring base station, that is, a resource configuration procedure which is beam scheduling, has been described with reference to FIGS. 7 to 9 to solve a deviation of interference according to a directivity of a beam when measuring channel quality of a serving cell and a neighboring cell. In addition, a beam configuration procedure for optimal beamforming within a limited resource has been described with reference to FIG. 10 and FIG. 11. In case of a terminal which operates in a predetermined section (e.g., via a train, a car on a highway, on foot), the management device may jointly coordinate a beam operation of a serving base station and a neighboring base station through a beam configuration procedure and resource allocation procedure according to the disclosure, that is, through a measurement configuration procedure, to optimize a measurement environment in a beamforming-based communication system. In the optimized measurement environment, the terminal performs a handover at a more accurate time, so that a delay time caused by an unnecessary handover can be decreased while ensuring continuity of a service.

Methods based on the embodiments disclosed in the claims and/or specification of the disclosure can be implemented in hardware, software, or a combination of both.

When implemented in software, a non-transitory computer readable recording medium for storing one or more programs (i.e., software modules) can be provided. The one or more programs stored in the non-transitory computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) can be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device can have an access to a device for performing an embodiment of the disclosure via an external port. In addition, an additional storage device on a communication network can have an access to the device for performing the embodiment of the disclosure.

In the aforementioned specific embodiments of the disclosure, a constitutional element included in the disclosure is expressed in a singular or plural form according to the specific example embodiment proposed herein. However, the singular or plural expression is selected properly for a situation proposed for the convenience of explanation, and thus the various embodiments of the disclosure are not limited to a single or a plurality of constitutional elements. Therefore, a constitutional element expressed in a plural form can also be expressed in a singular form, or vice versa.

While the disclosure has been shown and described with reference to certain preferred embodiments thereof, it will be understood by those skilled in the art that various changes in form and details may be made therein without departing from the spirit and scope of the disclosure as defined by the appended claims and their equivalents. Therefore, the scope of the disclosure is defined not by the detailed description thereof but by the appended claims, and all differences within equivalents of the scope will be construed as being included in the disclosure.

What is claimed is:

1. A management device in a wireless communication system, the device comprising:
   at least one transceiver; and
   at least one processor operatively coupled to the at least one transceiver,
   wherein the at least one processor is configured to:
      identify a designated path based on a movement of a terminal,
      identify a base station set corresponding to the designated path, the base station set including a first base station and a second base station,
      identify a beam set of the base station set for the designated path, the beam set including a first beam of the first base station and a second beam of the second base station,
      control the first base station to transmit a first measurement signal for a serving cell of the first base station by using the first beam of the first base station on a first time resource, and
      control the second base station to not transmit a second measurement signal for a neighboring cell of the second base station by using the second beam of the second base station on the first time resource,
   wherein the first measurement signal and the second measurement signal are used to perform a handover from the first base station to the second base station,
   wherein the second base station of the base station set is located within a threshold range of the first base station on the designated path, the threshold range is configured based on a velocity of the movement of the terminal, and
   wherein the first measurement signal is transmitted a number of times on the first beam based on a number of base stations in the base station set that is located within the threshold range of the first base station of the designated path.

2. The device of claim 1,
   wherein the at least one processor is further configured to control the first base station to transmit a third measurement signal using a third beam of the first base station on a second time resource, and
   wherein the third beam does not spatially overlap with the second beam.

3. The device of claim 1,
   wherein the beam set is identified based on a velocity of the movement of the terminal, and
   wherein the management device is equipped with the first base station.

4. The device of claim 1, wherein the at least one processor is further configured to:
   control the first base station to not transmit a signal in a time resource in which a random access procedure is performed with respect to the second base station when the handover is performed.

5. The device of claim 1, wherein the at least one processor is further configured to:
   identify the first beam among beams of the first base station based on at least one of location information of the first base station with respect to the designated path, location information of the second base station with respect to the designated path, information on an antenna of the first base station, or information on an antenna of a terminal; and
   identify the second beam among beams of the second base station based on the at least one of the location information of the first base station with respect to the designated path, the location information of the second base station with respect to the designated path, information on an antenna of the second base station, or the information on the antenna of the terminal.

6. The device of claim 1, wherein the second beam is identified according to a region of the designed path corresponding to the first beam of the first base station.

7. The device of claim 1,
   wherein the first measurement signal is a synchronization signal or a reference signal, and
   wherein the second measurement signal is the synchronization signal or the synchronization signal.

8. A method performed by a management device in a wireless communication system, the method comprising:
   identifying a designated path based on a movement of a terminal;
   identifying a base station set corresponding to the designated path, the base station set including a first base station and a second base station;
   identifying a beam set of the base station set for the designated path, the beam set including a first beam of the first base station and a second beam of the second base station;

controlling the first base station to transmit a first measurement signal for a serving cell of the first base station by using the first beam of the first base station on a first time resource; and controlling the second base station to not transmit a second measurement signal for a neighboring cell of the second base station by using the second beam of the second base station on the first time resource, wherein the first measurement signal and the second measurement signal are used to perform a handover from the first base station to the second base station, wherein the second base station of the base station set is located within a threshold range of the first base station on the designated path, the threshold range is configured based on a velocity of the movement of the terminal, and wherein the first measurement signal is transmitted a number of times on the first beam based on a number of base stations in the base station set that is located within the threshold range of the first base station of the designated path.

9. The method of claim 8, further comprising:
controlling the first base station to transmit a third measurement signal using a third beam of the first base station on a second time resource,
wherein the third beam does not spatially overlap with the second beam.

10. The method of claim 8, wherein the beam set is identified based on a velocity of the movement of the terminal, and wherein the management device is equipped with the first base station or the second base station.

11. The method of claim 8, further comprising:
controlling the first base station to not transmit a signal in a time resource in which a random access procedure is performed with respect to the second base station, when the handover is performed.

12. The method of claim 8, further comprising:
identifying the first beam among beams of the first base station based on at least one of location information of the first base station with respect to the designated path, location information of the second base station with respect to the designated path, information on an antenna of the first base station, or information on an antenna of a terminal; and
identifying the second beam among beams of the second base station based on at least one of the location information of the first base station with respect to the designated path, the location information of the second base station with respect to the designated path, information on an antenna of the second base station, or the information on the antenna of the terminal.

13. The method of claim 8, wherein the second beam is identified according to a region of the designed path corresponding to the first beam of the first base station.

14. The method of claim 8,
wherein the first measurement signal is a synchronization signal or a reference signal, and
wherein the second measurement signal is the synchronization signal or the synchronization signal.

15. A first base station in a wireless communication system, the first base station comprising:
at least one processor; and
at least one transceiver,
wherein the at least one processor is configured to:
identify a designated path based on a movement of a terminal,
identify a base station set corresponding to the designated path, the base station set including the first base station and a second base station,
identify a beam set of the base station set for the designated path, the beam set including a first beam of the first base station and a second beam of the second base station adjacent to the first base station according to the designated path, and
control the at least one transceiver to transmit a first measurement signal for a serving cell of the first base station by using the first beam of the first base station through a first time resource,
wherein the first time resource is a time resource for not transmitting a second measurement signal using the second beam of the second base station,
wherein the first measurement signal and the second measurement signal are used to perform a handover from the first base station to the second base station,
wherein the second base station of the base station set is located within a threshold range of the first base station on the designated path, the threshold range is configured based on a velocity of the movement of the terminal, and
wherein the first measurement signal is transmitted a number of times on the first beam based on a number of base stations in the base station set that is located within the threshold range of the first base station of the designated path.

16. The first base station of claim 15,
wherein the at least one processor is configured to transmit, to a terminal, a configuration message for a handover based on the first measurement signal and the second measurement signal, and
wherein the first base station is configured to not transmit a signal using the first beam in a second time resource.

* * * * *